UNITED STATES PATENT OFFICE.

ALFRED GEORGE SAUNDERS, OF ADELAIDE, SOUTH AUSTRALIA, AUSTRALIA.

PROCESS OF MAKING MINERAL ABSORBENT PREPARATIONS.

SPECIFICATION forming part of Letters Patent No. 710,521, dated October 7, 1902.

Application filed June 7, 1902. Serial No. 110,696. (No specimens.)

*To all whom it may concern:*

Be it known that I, ALFRED GEORGE SAUNDERS, engineer, a subject of His Britannic Majesty King Edward the Seventh, residing at No. 48 Carrington street, Adelaide, in the State of South Australia, Commonwealth of Australia, have invented certain new and useful Improvements in Processes of Making a Mineral Absorbent Preparation, of which the following is a specification.

This invention relates to an improved absorbent mineral preparation, the basis of such preparation being carbonaceous clay, which when treated by the process hereinafter specified is capable of being applied to many of the useful arts and manufactures to take the place of more expensive or heavier components which have hitherto been in use.

The invention also relates to the process whereby the absorbent mineral preparation is manufactured.

The carbonaceous clay which I prefer to use for purposes of my invention is found on the sandy shores of northern coastal inlets in this State and is usually met with in layers of from three inches to two feet in thickness and at a depth of from six inches to, say, three or four feet below the surface and may be readily distinguished by its bluish-gray appearance.

The process of treating this clay is as follows: The carbonaceous clay in its natural form is ground to a finely-divided state and allowed to soak in tanks of water for about three days, so that all sandy grit and other hard impurities may settle to the bottom.

The fine carbonaceous clay which lies on the surface is then removed and placed in vats, where it is boiled at a high temperature (approximately of 200°) with caustic soda, the boiling operation occupying one and a half hours and the mixture being kept in a state of agitation during this part of the process. The mixture is then allowed to cool and settle and the caustic soda is drawn off, after which the residue is removed to another vat and is thoroughly washed with pure water, which is subsequently drawn off. The material is then washed with a weak solution of sulfuric acid, the sulfuric acid representing about one per cent. density. The composition is once more washed with fresh water, after which it is placed on netting, canvas, or other fine-grained material, so that it may be thoroughly dried. When this has been done, the cakes of the material are thoroughly ground and sifted through fine silk or other sifting material, so as to bring it to the consistency of wheaten flour. In this condition it is ready for use in the arts and manufactures.

Without attempting to enumerate the many purposes for which my improved absorbent mineral preparation can be used I will proceed to exemplify a limited number of applications.

In the manufacture of explosives, and particularly where nitroglycerin is used, it can be applied as one of the ingredients, being capable of absorbing fully one hundred per cent. of its own quantity, by weight, of glycerin, thus preventing what is known as "sweating," and thereby minimizing the danger of premature explosion.

The material when manufactured according to my specification is capable of being vulcanized, and as a substitute for vulcanite is suitable for railway, electrical, and other purposes, and it may also be used in conjunction with and as a part of india-rubber preparations. It may also be embodied with other ingredients in the manufacture of soap, being highly absorbent and containing great cleansing properties.

The preparation is also capable of being mixed to a paste with water for the purpose of forming the matrix or mold for stereotype in connection with printing, or it may be worked up with other materials to be used as a substitute for cork in the manufacture of linoleum. I find by practical experiment that when mixed with a small percentage of other materials, such as india-rubber and paper, it is exceedingly light and resilient and may be used as a substitute for india-rubber for various purposes—as, for instance, in the manufacture of tennis-balls and in lieu of pneumatic tires for cycles and the like. It will therefore be understood from the wide range of manufactures to which this preparation may be applied that the invention is not merely to be confined to the purposes above mentioned.

Having now particularly described and ascertained the nature of my said invention and in what manner the same is to be performed, I declare that what I claim is—

The herein-specified process for manufacturing an absorbent mineral preparation wherein carbonaceous clay is first ground to a powder then soaked in tanks of water to allow impurities to settle subsequently adding caustic soda to the clean carbonaceous clay and boiling the mixture at high temperature the mass being kept in a state of agitation during the process of boiling subsequently washing the material with a weak solution of sulfuric acid when cool again washing and drying the resultant composition.

In testimony whereof I have hereunto set my hand in presence of two subscribing witnesses.

ALFRED GEORGE SAUNDERS.

Witnesses:
JOHN HERBERT COOKE,
FREDERICK TEMPLER.